Feb. 13, 1934.　　　E. S. HUFF　　　1,947,087
GAS TORCH
Filed July 25, 1928
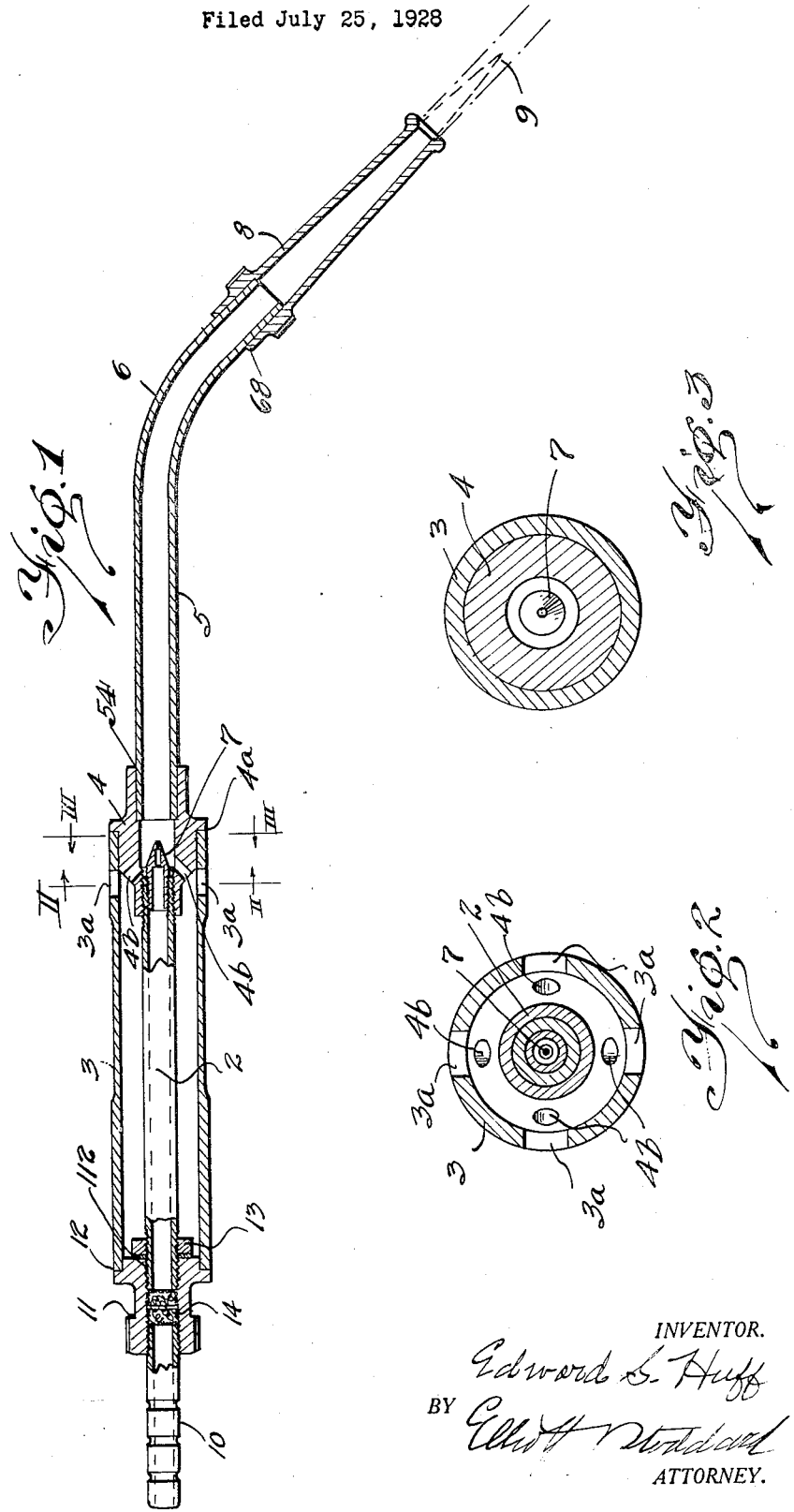
INVENTOR.
Edward S. Huff
BY
ATTORNEY.

Patented Feb. 13, 1934

1,947,087

UNITED STATES PATENT OFFICE 1,947,087

GAS TORCH

Edward S. Huff, Dearborn, Mich.

Application July 25, 1928. Serial No. 295,235

1 Claim. (Cl. 158—109)

My invention relates to a gas torch and objects of my improvement are to provide a torch that shall concentrate the heat of the flame delivered therefrom and that has an improved construction.

In the accompanying drawing:

Figure 1 is a longitudinal section through the axis of a torch embodying my invention.

Figure 2 is a section of the same in the plane indicated by the line II—II, Figure 1.

Figure 3 is a section in the plane indicated by the line III—III, Figure 1.

2 is a small pipe of convenient length, screw threaded at its ends. 4 is a fitting adapted to screw upon the delivery end of the pipe 2 and having an axial aperture therethrough. The fitting 4 is turned down towards its inner portion to form the shoulder 4a.

11 is a second fitting turned down to form the shoulder 12 at its inner portion and having a screw threaded axial aperture therethrough. The fitting 11 is screwed upon the end of the pipe 2 at 112 and there is a nut 13 engaging the screw threads upon the pipe 2, adjacent to the inner face of the fitting 11. 10 is a nipple fitting in the outer end of the aperture, through the fitting 11, adapted to receive a hose through which the gas is supplied under pressure.

3 is a cylindrical casing fitting at its end upon the downturned portions of the fittings 4 and 11, its end engaging against the shoulders 4a and 12. There are apertures 3a through the wall of the casing 3, adjacent to the inner end of the fitting 4. 4b are apertures formed through the wall of the fitting 4 communicating at one end with a space between the casing 3 and the pipe 2 and at the other end opening into the bore of said fitting beyond the end of the pipe 2.

5 is a pipe engaging and fixed in the bore of the fitting 4, at the outer end of said fitting, extending a distance from said fitting then turning at 6 and extending at an angle to the first portion of said pipe. 8 is a nozzle having a bore converging to its delivery end engaging the end of the pipe 5 at 68.

7 is a nipple with a very small aperture in the axis thereof opening to the interior of the fitting 4, said aperture being continued in the bore of said nipple, which at its outer end opens to the interior of the gas pipe 2.

14 is a strainer consisting of two gauze caps having their open end toward each other and absorbent cotton interposed therebetween.

The gas is delivered to the interior of the pipe 2, under pressure, by a hose passing over the nipple 10 and is forced through the delivery aperture of the nipple 7 into the interior of the fitting 4 and draws with it air through the apertures 3a and 4b. The mixture passes along and is thoroughly mixed in the pipe 5. The stream of mixed gas and air diminishes gradually in cross section, as it passes along the frusto-conical interior wall of the nozzle 8 and is caused to converge more rapidly to a point 9 where the heat is very intense.

It will be noticed that the mixing chamber formed by the interior of the pipe 5 is of considerable length and uniform diameter, except where it converges to the delivery end. Thus the air and gas are thoroughly mixed and passed in an uniform stream to the converging delivery end and the frusto-conical wall at this end is efficient in controlling the flow of the mixture and the direction thereof.

The casing 3 forms a convenient handle and the whole construction is easily assembled.

What I claim is:

The combination of a pair of couplings 4 and 11 having bores therethrough, a screwed pipe 2 joining said couplings, a casing 3 engaging said couplings at its ends and surrounding same, a nipple in the delivery end of said pipe 2, a supply nipple engaging in the bore of one of said couplings 11, a delivery pipe engaging in the bore of the other of said couplings 4, an aperture through said casing and an aperturne through the wall of the last named coupling 4 opening into the bore of said coupling at the delivery end of said nipple at one end and to the chamber formed between the casing 3 and pipe 2 at the other end.

EDWARD S. HUFF.